United States Patent [19]
Hata et al.

[11] 3,865,661
[45] Feb. 11, 1975

[54] PROCESS FOR MANUFACTURING A POROUS THERMOPLASTIC RESIN ARTICLE REINFORCED BY A GLASS MATT

[75] Inventors: Akio Hata, Shinnanyo; Hiroshi Saeki, Hikari, both of Japan

[73] Assignee: Tokuyama Sekisui Kogyo Kabushiki Kaisha, Kita-ku, Osaka-shi, Japan

[22] Filed: Mar. 12, 1973

[21] Appl. No.: 340,264

[30] Foreign Application Priority Data
Mar. 10, 1972 Japan................................ 47-25020

[52] U.S. Cl..................... 156/79, 156/62.2, 156/77, 156/180, 156/283
[51] Int. Cl........................................... B29c 25/00
[58] Field of Search............ 65/4, 3; 156/62.2, 62.6, 156/77-79, 167, 180, 166, 283; 264/60, 230

[56] References Cited
UNITED STATES PATENTS
3,687,712   8/1972   Hartmann............................ 156/167
3,742,106   6/1973   Price................................... 156/167

*Primary Examiner*—Charles E. Van Horn
*Assistant Examiner*—Jerome Massie
*Attorney, Agent, or Firm*—Armstrong, Nikaido & Wegner

[57] ABSTRACT

Thermoplastic resin is mixed with glass fibre matt or matts, and the resulting mixture is heated above a temperature at which the resin is at least molten on its surface and compressed to form a shaped article. Thereafter, the shaped article is maintained in a temperature more than flowing temperature of the resin, and in that state pores are formed in the article by restoring force of the glass fibres in order to obtain a porous thermoplastic resin article reinforced by glass fibre matt.

10 Claims, No Drawings

PROCESS FOR MANUFACTURING A POROUS THERMOPLASTIC RESIN ARTICLE REINFORCED BY A GLASS MATT

DETAILED EXPLANATION OF INVENTION

This invention relates to a process for manufacturing a porous thermoplastic resin article reinforced by glass matt which comprises forming pores in the thermoplastic resin article by means of elastic restoring force of glass fibres. This invention further relates to a bonded product in which the porous thermoplastic resin article thus manufactured is used as a constituting material thereof.

Conventional methods have used a foaming agent which generates gas in order to manufacture a foamed thermoplastic resin article. Above foaming agent acts satisfactorily when it is intended to obtain a foamed thermoplastic resin article which does not contain long fibres therein, however, when it is intended to manufacture a foamed thermoplastic resin article which is reinforced by long fibres, above-mentioned foaming agent does not act satisfactorily. Therefore, in general, the foaming agent does not bring about a good result in order to obtain a foamed, reinforced article of good quality. This is because long fibres contained in the resin prevent the resin from expanding and consequently the resin becomes difficult to expand.

It has been found that if a specific matt of glass fibres is used together with thermoplastic resin, then the resin is easily made porous by elastic restoring force of glass fibres, and as the result a porous article can be obtained. This invention is based upon above finding.

In the invented process a specific glass fibre matt is used, which is, for example, constructed by allowing a number of continuous strands to entangle one another in random state. The matt diminishes in apparent volume when compressed under pressure, and tends to restore elastically to its original volume when the pressure is removed. In the invented process said matt is, for example admixed with thermoplastic resin, annd the resulting mixture is heated under pressure to obtain a preshaped article in which the matt is extremely depressed, then the article is expanded under heated conditions by means of restoring force of the matt, thus a shaped article having pores is obtained.

According to the invention there is provided a process for preparing a porous thermoplastic resin article reinforced by glass fibres which comprises using one or more matts of glass fibres, which have a bulk density of 0.4 g/cm$^3$ or less when compressed under the pressure of 10 g/cm$^2$, and also a bulk density of 0.6 g/cm$^3$ or less when compressed under the pressure of 1000 g/cm$^2$, and further which have an inherent property that the matts restore elastically to more than 50 percent volume of the original volume when said pressures are removed. 5 – 70 weight parts of said matts are admixed with 95 – 30 weight parts of thermoplastic resin, the resulting matts heated and pressed above a temperature at which the resin is fused, thereafter forming pores by means of restoring force of the glass fibres while being heated at a temperature higher than flowing temperature of the resin.

Glass fibre matts used for a raw material in the present invention have now been available on the market. One of the raw materials is the glass fibre matt sold under the name of "Glasslon Continuous Matt" by Asahi Fibre Glass Co. However, it is not clear by what method the glass fibre matt named Glasslon Continuous Matt is manufactured.

According to the Japanese Patent Publication No. 80/1957, there may be obtained a glass matt which can be used in the present invention. Above Publication describes a process for crooking the glass fibres which comprises pulling glass fibre strands out of nozzles, and allowing the strands to collide with a slant plate, thus obtaining continuous strands crooked in arcuate form. When the crooked strands are entangled with each other to form a matt, the matt becomes light and fluffy. When such light and fluffy matt is compressed, the matt can diminish in volume, and if pressure acting on the matt is removed, the matt can elastically restore nearly to its orignial apparent volume. Therefore, according to above process, there is obtained a matt of glass fibre strands which may be used for a raw material in this invention. Problems are remained only in connection with the facts as to in what extent the apparent volume will be decreased by the matt when placed under pressure, and how much restoring force the matt will exert when the pressure is removed.

It is clear that in case of a matt which is formed from continuous crooked strands of glass fibre, the apparent volume and restoring force of a glass matt is effected by crooked degree of glass fibres constituting the matt, and also with arranging manner of the glass fibres when the matt is formed. The crooked degree of glass fibres varies according to the angle between the advancing direction of the molten glass fibre and a slant plate against which the fibre collides. However, it is difficult to define the apparent volume and restoring force of the glass matt by the manufacturing method of the matt. Further, it is not limited to said matt that can be used in this invention. Therefore, the glass matt which can be used in this invention cannot be defined by the apparent volume and restoring force of the obtained glass matt.

One of the glass strand matts which can be used in the present invention is formed by preparing crooked glass fibre strands by collision of molten glass fibre strands against a slant plate, and allowing a number of the glass fibre strands to intricately entangle each other. This kind of glass strand matt is called as glass continuous matt. However, the strand matt which can be used in this invention is not limited to said matt. The matt may be a surfacing matt or overlay matt. The surfacing matt and overlay matt are not constituted by strands, but are constituted of monofilaments which are continuous and do not contain any of portions crooked in arcuate form. The surfacing matt is manufactured by continuously pulling molten glass from nozzles, blowing off the pulled molten glass by high pressure steam or air to stretch it and thus forming continuous monofilaments, gathering said monofilaments on a wire belt to form a thin matt in which the monofilaments are oriented in various directions, and adding bonding agents to fix the matt form. The filament is about 5 to 20 microns in diameter.

Besides, a glass wool matt manufactured by Brust method can be also used for the glass matt in this invention. The glass wool matt is manufactured by flowing out continuously molten glass from nozzle, blowing off and stretching the molten glass by a gas burner to form linear filaments having diameter of 0.5 to 10 microns, cutting the filament about 30 mm in length, gathering a number of the filaments on a conveyer belt in the form of a matt in which the filaments run in random directions, and adding thereto a bonding agent. Similarly, a glass wool matt manufactured by Rotary method can be used. The matt by Rotary method is manufactured by putting molten glass into a rotor with a multiplicity of perforations, rotating said rotar at high speed to centrifuge off the molten glass through said perforations to form flocculent filaments, and forming said filaments into a matt.

Thus, from appearance of the glass matts, it can be said that the glass matts used in this invention are all in the form of a matt which is of high bulk and of large volume in comparison with the weight thereof, and the matts are constituted by irregular and random crossing of a number of fibres or stands. The matts may be easily decomposed into individual glass fibres or strands, and therefore can be easily changed in shape. The glass fibres constituting the matt may be short fibres or long fibres. The long fibres may be, for example, in such forms as crooked spirally or arcuately. In case of short fibres, the matt may be prepared by the method in which the short fibres are blown by means of wind to pile the fibres in random state and in high bulk.

It can be said that the glass matt used in this invention have the following physical properties: When the matt is placed under slight pressure, the matt diminishes considerably in apparent volume from its original. When the pressure is removed, the matt tends to restore to its original apparent volume, expressing a considerable restoring force. This property is due to the fact that the glass fibres or strands are irregularly entangled each other and form a bulky matt. For example, in case of continuous strand matt, arcuated portions of glass strands run in random directions in the matt, so that the matt becomes bulky, and if the matt is placed under compressive force, the matt is excessively decreased in apparent volume, due to the fact that arcuated portions running in acting direction of the compressive force are depressed and flattened. Since the glass fibres or strands themselves are rich in elasticity, the matt tends to restore it its original apparent volume with considerable restoring force, and if the compressive force is removed, the matt elastically restores almost to its original volume. This restoring force acts as a pore-generating force in the thermoplastic resin coexisting with the matt.

When the matt shows small change in apparent volume and small restoring force, the matt does not give a good porous article. Thus, it becomes necessary to define the apparent volume change and the restoring force with respect to the glass fibre matt. The inventor has defined them by bulk densities of the glass matt when the matt is placed under the pressure of 10 g/cm$^2$ and of 1000 g/cm$^2$ and also by restoring ratios when said pressures are removed.

For the convenience's sake, bulk density of the glass matt is measured in the following manner: At first, 126 g of glass fibre matts are dispersed on a plate of 30 cm × 30 cm so as to be even in thickness, then a plate of stainless steel of 30 cm × 30 cm × 0.2 cm is placed thereon, and a load is further put on the stainless steel plate. This load is selected so that the total weight of said load and stainless steel plate may be 9 kg, and the load is positioned on the center of the stainless steel plate so that the load may weigh equally upon every portion of the matt. Under such loaded conditions, distances between said two plates are measured at five points optionally chosen, and the mean value of the distances is calculated. The mean value is considered as an average thickness of the matt under the pressure of 10 g/cm$^2$. Using the average thickness, bulk density of the matt under the pressure of 10 g/cm$^2$ is calculated from the following formula:

bulk density = (126/30 × 30 × (average thickness of the matt)) (g/cm$^3$)

Likewise, an average thickness of the matt is measured under the pressure of 1000 g/cm$^2$ by adjusting the total weight of the stainless steel and another load to 900 kg, and a bulk density under 1000 g/cm$^2$ is calculated from the average thickness thus measured.

When volume changes of the glass fibre matt are considered on the basis of the above-mentioned bulk densities, it has been found that the glass fibre matt gives a good foamed article when the glass fibre matt has a bulk density of 0.4 g/cm$^3$ or less under pressure of 10 g/cm$^2$, and a bulk density of 0.6 g/cm$^3$ or less under 1000 g/cm$^2$. That is, when bulk densities are more than said values, the glass fibre matt has too small volume changes, and as the result the matt has not sufficient power to make the resin porous. Also it is necessary for the matt to have a large restoring force. Necessary restoring force is defined as that, the matt should restore elastically to more than 50% of the original volume, when the matt is compressed by the forces from 10 g/cm$^2$ to 1000 g/cm$^2$ and then the forces are removed.

The original volume herein referred to is set forth as follows: 126 grams of the glass matt, which is not tested with reference to the bulk density, are evenly distributed on a plate of 30 cm × 30 cm, and thereon is placed a square plate of aluminium having a side of 30 cm and equal thickness, of which weight is 400 g, in order to make even and flat the surface of the glass matt. Under such conditions, distances between said two plates are measured at five points optionally chosen, and a mean value of said distances is considered as an average thickness of the matt. Using the average thickness, the original volume is calculated from the following formula:

original volume = 30 cm × 30 cm × (average thickness/of the glass matt) cm

In the present invention, thermoplastic resin is mixed with the above-mentioned glass fibre matt. Most of the resin can be used so far as the resin is thermoplastic. The thermoplastic resin may be, for example, polyvinyl chloride, polyethylene, polypropylene, polystyrene, polymethyl methacrylate, copolymer of vinyl chloride and ethylene, copolymer of vinyl chloride and vinyl acetate, copolymer of ethylene and vinyl acetate, copolymer of ethylene and propylene, copolymer of acrylonitrile and styrene, copolymer of acrylonitrile, styrene and budadiene. These resins may be incorporated by auxiliary agents such as plasticizers, stabilizers, dyestuffs, pigments and fillers, if necessary. In a specific case, the resin may be incorporated by foaming agents, which will be explained later.

Preferably the thermoplastic resin is in the form of fine powders, however it may be particles of several mm in diameter, which is generally called as "pellets". The thermoplastic resin may be in the form of a film or a sheet, when the glass fibre matt is comparatively thin. Further, the thermoplastic resin may be in the form of emulsion or solution. The thermoplastic resin is preferably low in viscosity when molten. Mixing ratio of the glass fibre matt and the resin may be determined case by case within the range of the former 5 – 70 parts and the latter 95 – 30 parts by weight. In case wherein the resin includes auxiliary agents such as plasticizers, the resin ratio is determined on the basis of the resin content, that is, excluding the auxiliary agents. In general, when the glass fibre content is high, the resulting final porous article becomes high in strength and porosity, while a procedure to obtain the final porous article becomes difficult.

For mixing the glass fibre matt with the resin, a procedure may be adopted in which the glass fibre matt is made at first into the form of a thin sheet, then the resin is dispersed on the sheet, thereon another sheet is further placed, and the resin is dispersed on the sheet, thus, the glass fibres and the resin are placed by turns. In this case, if it is desired to obtain a final article in which the glass fibre matt and resin are evenly dispersed, it is necessary to choose the resin in powder form which is as fine as possible and to disperse the resin as evenly as possible in the glass fibre matt. Mixture of the resin and glass fibre matt thus obtained is once formed into a preshaped article by heating and pressing the mixture. The heating is preferably conducted to such a degree that the resin is sintered fused and forms a bonded mass together with the glass fibre matt. However, the heating should not be conducted at such a high temperature that the resin are decomposed. Thus suitable heating temperature should be chosen according to characteristics of the resin used. The pressing is conducted in such a way that the glass fibre matt is pressed to be as small as possible in apparent volume thereof. Suitable degree of the pressing varies according to characteristics and amount of the glass fibre matt as well as those of the resin. Approximate standard of the pressing is within the range of 0.1 – 50 kg/cm², preferably 5 – 30 kg/cm², when the economical factor is also considered. The mixture is once formed into a preshaped article under above-mentioned conditions.

The preshaped article thus formed may be once cooled, and be taken out as the preshaped article. Then the article is heated again and made porous by means of restoring force of the glass fibres. (In this case, heating for revealing the restoring force is referred to as the second heating.) Alternatively, the preshaped article may be made porous by subsequent removal of pressing force while the first heating for preparing the preshaped article is conducted, that is, without cooling and taking out the preshaped article. In both cases, heating for revealing the restoring force of the matt should be above such a temperature that the resin is molten and begins to flow. And accordingly, the second heating temperature is normally higher than the first heating temperature at which the preshaped article is manufactured by pressing the mixture. However, in some cases, the temperature when the restoring force is exerted is the same as that when the preshaped article is manufactured. Preferably the temperature when the article is made porous is maintained so that apparent melt viscosity of the resin may be less than $2 \times 10^5$ poises. In general, apparent melt viscosity of the resin is defined by the following formula:

$$\eta a = \tau'/r' = R^4 P/8QL$$

wherein
$\tau'$ represents apparent shear strength (dyne/cm²)
$r'$ represents apparent shear velocity (sec⁻¹)
R represents radius of nozzle (cm)
P represents load (dyne/cm²)
Q represents amount of extruded resin (cm³/sec)
L represents length of nozzle (cm)

When the preshaped article is heated in order to be made porous, no pressure is normally applied to the preshaped article. If any pressure is applied, the pressure should be so low as to only prevent the article from unexpected deforming. The pressure should also be adjusted so as to allow the preshaped article to expand in volume, since this stage is provided to expect that the glass fibre matt restores to the original apparent volume. No matter the pressure may be applied or not, it is desirable to conduct the heating of this stage in a pertinent mould.

When the resin is molten and begins to flow by said heating, the glass fibre matt restores to the original apparent volume by inherent and latent restoring force. Thus, if the pressure is removed or allowed to decrease, the molten resin is moved together with glass fibres in the matt and forms pores in the article, consequently the article becomes porous in appearance as if the article were expanded by foaming agent. Some of the pores are isolated and some are communicated each other.

A foaming agent may be incorporated into the resin. The foaming agent may be a compound which generates gas when heated to higher than the temperature at which it decomposes. If the foaming agent is used, it is preferable to mix the foaming agent with the resin, and to add the resulting mixture to the glass matt, thereafter to heat the mixture to form a preshaped article. The foaming agent should be selected so as to be decomposed above the temperature at which the resin is molten and begins to flow, but not decomposed in the stage in which the resin is sintered fused to form the preshaped article. When the foaming agent is incorporated in the resin, it helps to make the preshaped article porous, associating with the restoring force of the glass fibre matt. Therefore, if the foaming agent is incorporated, it is easy to obtain a porous article which is made highly porous.

Thus obtained final article is porous, therefore light in weight and has an excellent insulating property to heat and sound. So far as these properties are concerned, the final article does not differ from the conventional porous article. Due to these properties, the final article can have a wide variety of applications. Moreover, the final article contains the glass fibre matt therein, therefore is excellent in tensile strength, impact strength and resistance against bending. Subsequently, the final article is especially suited for use in applications where these strengths are required.

Above explanation was made with respect to a case where it is intended to obtain a porous article in which the resin and the glass fibres are almost evenly dispersed. The obtained article has a characteristic that it has a number of minute pores on the surfaces thereof. The characteristic on the surface is advantageous for adhering various materials to the surface, because the pores act as anchors in adhering the materials to the surface. Thus, in connection with the final article, a new specific field of application has been given. In the field, it is necessary for the article to be provided with a number of minute pores only on the surface, however, it is not necessary to be provided with any of minute pores in the inner portion. This invention further provides a process for preparing a complex or bonded product in which another material is further applied on the porous surface of the final article.

As already stated, in the field wherein a complex product is desired, it is necessary for the above-mentioned article to be provided with pores only on a surface of the aticle, but not necessary for the article to be made porous even in the inner portion thereof. Therefore, for this purpose, it is enough to provide with the glass matt only in the surface portion of the article. Thus, the mixing ratio of glass matt against resin that should be within a range of 5 – 70 parts against 95 – 30 parts by weight, (said ratio having been required for obtaining an article made porous even in the inner portion thereof), is required only for preparing the surface portion of the article. In this case, it is enough if such surface portion is given in 0.5 mm thick when pre-shaped article has been prepared.

On the other hand, a final article whose inner portion has only been made porous may be advantageously employed in another specific field of application. For example, a product has been needed which has flat and smooth surfaces and porous inner portion, because the product is light in weight and strong in rigidity. This invention can be also applied in preparing such a product. One way is to prepare two pieces of a final article having a porous portion on one surface thereof according to above-mentioned process, and then to apply two pieces together with the porous surface faced to the porous surface. Another way is to prepare a final article, of which inner portion is only made porous, by applying above-mentioned process to only said inner portion. In both way, if a foaming agent which generates gas is incorporated in the resin, a product which has a highly porous inner portion can be obtained.

Various materials can be used for applying to porous surface of the final article. The materials should be in liquid or gelling state when they are to be applied, and that when having applied they do not attack or deteriorate said final article. If the materials are as stated above, most of the materials can be used. For example, thermoplastic resin which is different from the resin used for preparation of the article can be used. For example, when polyvinyl chloride has been used for preparation of the article having a porous surface, polyethylene can be used for applying to said article to form a complex article. Further, thermosetting resin, for example, phenol formaldehyde resin, melamine formaldehyde resin, and unsaturated polyester resin can be used for applying to said article. Besides, hardenable inorganic material such as portland cement, alumina cement, gypsum can be used for applying to said article.

In order to bond said materials to above-mentioned porous surfaced article, a suitable method may be selected according to the materials. Fundamental principle resides in that, the materials are allowed to penetrate into pores formed on the surface of the article, while the materials are in liquid state, and then to solidify. For example, a method may be adopted in which the materials are heated and pressed to the surface of the article, or in which the materials are only pressed without being heated. The former may be adopted when the materials are thermoplastic resins or thermosetting resins, while the latter portland cement. In the former, for example, the thermoplastic resin powders such as polyethylene, or initial condensation product of the thermosetting resin such as phenol formaldehyde resin, are placed on a shaped article whose surface portion has been rendered porous by glass matt, then they are heated and pressed to form the resin powders or condensation product into a certain shape and also to allow the powders or product to penetrate into pores on the surface of the article, thereafter cooled to solidify it, thus a complex or bonded article is obtained. In the latter, portland cement is at first mixed intimately with water, thereto are added sands and the like, thus cement mixture is obtained. The cement mixture is applied on porous surface of the porous article, then the cement mixture is hardened under atmospheric pressure or under pressure. In this case, of course, the cement mixture may be heated if the ambient temperature is too low, however it is not necessary to heat the cement mixture.

In the above-mentioned method, the article has been made porous at least on one surface thereof due to glass fibre matt, the material to be applied and bonded thereto is allowed to penetrate into pores formed on said surface, and the material is hardened in penetrating state. Therefore, the material gives rise to what is called anchoring effect on said surface, and consequently the material is firmly adhered to the surface of the article. Thus, a firmly bonded product is obtained, without using adhesive. Therefore, when there is no good adhesive between two substances, such as between polyvinyl chloride and polyethylene, or polyvinyl chloride and portland cement, the two substances can be satisfactorily bonded together according to the above-mentioned method. If there is a good adhesive between the two substances, the adhesive may, of course, be used for bonding the substances by applying the adhesive previously on the porous surface of the article prior to the bonding. If the adhesive is used, the two substances are bonded together more firmly.

The complex product or bonded product thus prepared has various characteristics according to the material bonded to the porous surfaced article. If the bonded product is constituted from two kinds of thermoplastic resin, the bonded product can be used in various applications, because the bonded product represents different properties against chemicals according to inside or outside. When the bonded product is constructed from thermoplastic resin and thermosetting resin, thermoplastic resin portion in the bonded product becomes to be improved by the thermosetting resin portion. If the thermoplastic resin is bonded with concrete of portland cement, the resin in the bonded product is exceedingly improved by the cement in compressive strength. In any of above cases, there are a number of glass fibres on porous surface of the article, therefore the glass fibres strengthen the bonded product, and accordingly there can be obtained a bonded product which is high in mechanical strength. Further, when the porous portion in the article is increased in thickness, there can be obtained a bonded product which is light in weight and has superior insulating properties to heat and sound.

The porous thermoplastic article containing glass fibre matt may be in the form of a plate, tube, pipe or the like, or it may be in the intricate form into which has been made by further fabricating said plate, tube, pipe or the like. Thus, according to the shapes of the article, various shapes of the bonded product can be obtained.

Following examples will serve to illustrate the present invention. In the examples, tensile strength was measured according to JIS-K-6745 (Japanese Industrial Standard), bending strength was measured according to DIN-53452, and impact strength was measured according to DIN-53453.

EXAMPLE 1

A powdery copolymer of vinyl chloride and ethylene was used as a resin material, in which ethylene is contained 2 percent by weight, average polymerization degree of which is about 500.

There was used a glass fibre matt traded under the name of Glasslon Continuous Matt M 8600–300 (manufactured by Asahi Fibre Glass Co.). The glass fibre matt is flocculent and bulky in appearance and is constituted by glass fibre strands crooked spirally. Some of the glass fibre strands projected out of a surface of the matt. Therefore, it was difficult to decide the apparent volume of the matt precisely. When the matt was compressed under the pressure of 10 $g/cm^2$, the matt had about 0.2 $g/cm^3$ in bulk density. The matt had a bulk density of about 0.3 $g/cm^3$ under the pressure of 1000 $g/cm^2$. When said pressures were removed, volume of the matt restored elastically to about 80 percent of its original volume.

The glass fibre matt was admixed with the resin in the ratio of the former 30 and the latter 70 parts by weight. Admixing was conducted in such a manner that a sheet of the glass matt was at first placed and then some of the resin were evenly distributed on the matt, thereafter another glass matt was further placed on the resin distributed glass matt, then some of the remaining resin was evenly distributed on the glass matt, and thus three sheets of the glass matt were piled. Thus obtained admixture was inserted between two stainless steel plates and preheated up to about 170°C, then the admixture was placed on the pressing machine and was pressed at 170° C under 25 $kg/cm^2$ for 5 minutes. Thus, a plate (which was corresponding to a preshaped article) was prepared, which had the dimensions of 15 cm × 15 cm × 0.2 cm.

The said plate was put into a mold frame having the inner dimensions of 15 cm × 15 cm × 0.5 cm, then heated at 190°C for 5 minutes. The reason why 190°C was selected was that the apparent melt viscosity of the molten resin was observed to be 3.0 × $10^3$ poises at 190°C by means of Koka type flow tester. Then the resulting plate was cooled, thereafter was taken out, thus a porous plate was obtained.

The physical properties, of the porous plate was tested, as the result it had an expansion rate of 2.5 times, tensile strength 400 $kg/cm^2$, bending strength 500 $kg/cm^2$, and impact strength 15.0 kg/cm.

In addition, since the glass fibre matt used in this example was in the state as it was sold on the market, there was apprehension that any of binders may be attached to the glass matt. Therefore, it was necessary to confirm that above expansion was not due to gas generation on account of decomposition of the binders. For this purpose, the same glass matt was heated at 800°C and any of binders was decomposed and removed beforehand, then above-mentioned example was tried. As the result, it was confirmed that above expansion was not due to decomposition of the binders.

COMPARATIVE EXAMPLE 1

This comparative example was carried out in the same manner as in Example 1, except that a glass fibre matt having higher bulk density was used in this comparative example.

As the glass matt having higher bulk density, what is called chopped strand matt EMG 330 (manufactured by Nihon Glass Fibre Co.) was used. This matt was manufactured by dispersing chopped strands having 50 mm in length into the form of a matt, then bonding the strands by a binding agent in that form. The matt had a bulk density of 0.55 $g/cm^3$ under the pressure of 10 $g/cm^2$, and a bulk density of 0.9 $g/cm^3$ under the pressure of 1000 $g/cm^2$. When said pressures were removed, volume of the matt restored elastically to about 70 percent of its original volume.

This matt was used for preparing a porous article as in Example 1, however, a good porous article was not obtained because the article was delaminated. The porous article was tested, and the result showed that the article had 450 $kg/cm^2$ in tensile strength, 600 $kg/cm^2$ in bending strength and 8.0 kg/cm in impact strength.

EXAMPLE 2

In this example, polystyrene pellets Sytron 666 (manufactured by Asahi Dow Co.) was used as a resin, and the identical glass matt which was used in Example 1, was used as a glass matt.

Process for preparing a preshaped article from mixture of the glass matt and the resin was carried out in the same manner as in Example 1 and the preshaped article was obtained. That is, the preshaped article having dimensions of 15 cm × 15 cm × 0.2 was prepared by compression molding at 170°C under the pressure of 25 $kg/cm^2$ for 5 minutes.

Above preshaped article was made porous in the same manner as in Example 1, except that the heating temperature was maintained at 170°C for 5 minutes. Apparent melt viscosity of the molten resin at 170°C was confirmed to be 1.5 × $10^3$ poises by another testing.

The resulting porous article was tested and found that it was expanded into 1.3 times, and had tensile strength of 690 $kg/cm^2$, bending strength of 870 $kg/cm^2$, and impact strength of 14.4 kg/cm.

EXAMPLE 3

In this example, a porous article was obtained in the same manner as in Example 1, except that pplyvinyl chloride having average polymerization degree of 580 was used instead of copolymer of vinyl chloride and ethylene, both temperatures in preheating and in compression moulding were maintained at 190°C, and pressure in compression molding was maintained at 10 $kg/cm^2$.

Polyvinyl chloride used herein showed that it had apparent melt viscosity of 1.0 × $10^4$ poises at 190°C, when it was tested according to the method described in Example 1.

The porous article had an expansion ratio of 1.3 times, tensile strength of 920 $kg/cm^2$, bending strength of 800 $kg/cm^2$ and impact strength of 13.4 kgcm/cm.

EXAMPLE 4

In this example, a porous article was obtained in the same manner as in Example 1, except that polyethylene, of which trade name is Petrothene 248 (manufactured by Toyo Soda Co.) was used, both heating temperatures in preheating and in compression molding was made to 160°C, pressure in compression molding was made to 5 kg/cm², and heating temperature when made porous was made to 170°C.

Polyethylene used herein showed apparent melt viscosity of $1.5 \times 10^3$ poises at 170°C, when it was tested according to the method described in Example 1.

The porous article had an expansion ratio of 2 times, tensile strength of 260 kg/cm², bending strength of 80 kg/cm², and impact strength of 9.6 kgcm/cm.

EXAMPLE 5

In this Example, a porous article was obtained in the same manner as in Example 1, except that ABS resin (acrylonitrile-butadiene-styrene copolymer) was used, both temperatures in preheating and in compression molding were changed to 200°C, pressure in compression molding was changed to 10 kg/cm², and heating temperature when made porous was changed to 240°C.

ABS resin used herein showed apparent melt viscosity of $2.6 \times 10^3$ poises at 240°C, when it was tested according to the method described in Example 1.

The porous article had an expansion ratio of 1.5 times, tensile strength of 520 kg/cm², bending strength of 600 kg/cm², and impact strength of 20.8 kg/cm.

EXAMPLE 6

In this Example, copolymer of vinyl chloride and ethylene, containing 2 percent by weight of ethylene and having average polymerization degree of 420, was used, and the copolymer was formed beforehand into several thin sheets of equal thickness.

There was used a glass fibre matt which was sold under the trade name of Filament Matt MF 30 (manufactured by Nitto Spinning Co.). The matt was a thin sheet in high bulk and flocculent form. When six sheets of the matt were piled and placed together under the pressure of 10 g/cm², said sheets had a bulk density of 0.1 g/cm³. When said sheets, were placed under the pressure of 1000 g/cm², said sheets had a bulk density of 0.25 g/cm³. Further, when said pressures were removed, said sheets restored elastically in apparent volume to 95 percent of its original volume.

Said matts and resin sheets were mixed in a ratio of the former 25 parts by weight and the latter 75 parts by weight. In mixing these, six sheets of the glass matt were piled up together and placed on a resin sheet, then another resin sheet was further placed on the resultant sheets, further six sheets of the glass matt were placed, and at last a resin sheet was placed on the resultant sheets. Thus, three resin sheets and twelve sheets of glass matt were piled together to form a mixture of the matt and resin.

The mixture was inserted between two stainless steel plates, then preheated up to about 190°C, thereafter place in to pressing machine and compressed at 190°C under the pressure of 5 kg/cm² for 5 minutes, thus a preshaped plate having the dimensions of 20 cm × 20 cm × 0.3 cm was obtained.

Then the preshaped plate was placed on a wire net, and was heated in an oven at 190°for 10 minutes, thus a porous plate was obtained.

The resin used herein had an apparent melt viscosity of $2.5 \times 10^3$ poises at 190°C, when it was tested according to the method described in Example 1.

Said porous plate had an expansion ratio of 3.5 times, tensile strength of 70 kg/cm², bending strength of 45 kg/cm², and impact strength of 2.5 kgcm/cm. The porous plate had pores which communicate each other, and therefore had air flow resistance of 80 mm (water height) at flowing speed of 1 m/sec.

EXAMPLE 7

In this example, polyethylene, of which trade name was Petrothene 208 (manufactured by Toyo Soda Co.) was formed into sheets, then the sheets were used as a resin. For a glass fibre matt, a glass wool matt, of which trade name was Safelon SB 032 (manufactured by Toyo Kompojitto Co.), was used. This glass fibre matt was flocculent and bulky, and it was confirmed that when said matt was compressed under the pressure of 10 g/cm², said matt had a bulk density of 0.08 g/cm³, and under the pressure of 1000 g/cm² it had a bulk density of 0.20 g/cm³. Further, when said pressures were removed, said matt restored to 90 percent of its original volume.

Said matt and resin were mixed in a ratio of the former 30 parts by weight and the latter 70 parts by weight. In mixing these, three resin sheets and two glass matts were piled together alternately to form a mixture. This mixture was inserted between two stainless steel plates, and these were placed into pressing machine, and were compressed at 190°C under the pressure of 5 kb/cm² for 3 minutes, thus a preshaped plate having the dimensions of 20 cm × 20 cm × 0.3 cm was obtained.

Then the preshaped plate was placed on a wire net, and was heated in an oven at 190°C for 10 minutes, thus a porous plate was obtained. The resin used herein had an apparent melt viscosity of $1 \times 10^3$ poises when it was tested according to the method described in Example 1.

Said porous plate had an expansion ratio of 3.0 times, tensile strength of 80 kg/cm², bending strength of 60 kg/cm², and impact strength of 2.5 kgcm/cm. Further, the porous plate had pores which communicate each other and therefore had air flow resistance of 100 mm (water height) at flowing speed of 1 m/sec.

EXAMPLE 8

This example was carried out in the same manner as Example 1, except that a foaming agent was incorporated in the resin.

As the foaming agent, azodicarbonamide which was sold under the trade name of Unifoam AZ-L (manufactured by Otsuka Kagaku Yakuhin Co.) was used, which was added to the resin in the amoung of 0.1 part by weight, and then mixed intimately for 20 minutes.

Resultant porous plate had an expansion ratio of 3.0 times, tensile strength of 300 kg/cm², bending strength of 400 kg/cm² and impact strength of 15.0 kgcm/cm.

EXAMPLE 9

Identical glass matt as used in Example 1 was employed. Powdery copolymer of vinyl chloride and ethylene, containing 2 percent by weight of ethylene and having average polymerization degree of 500, was used for preparing a porous article by mixing with the glass matts.

Besides, polyethylene which was sold under the trade name of Milathon 1030 (manufactured by Mitsui Polychemical Co.) and which was for use in powder molding, was used for applying to said porous article.

20 parts by weight of said glass matt was mixed with 80 parts by weight of said copolymer. In mixing these, three fourth of the total weight of said copolymer was at first dispersed underneath, thereon two sheets of said glass matts were placed, and the remaining one fourth of the total weight of said copolymer was dispersed on the glass matt. Thus obtained mixture was inserted between two stainless steel plates, and these were preheated up to approximately 180°C, then placed into pressing machine, and was compressed under the pressure of 20 kg/cm$^2$, at 180°C for 5 minutes, thus a preshaped plate was obtained. The plate had the dimensions of 15 cm × 15 cm × 0.2 cm.

Then, the plate was put into a mold frame having inside dimensions of 15 cm × 15 cm × 0.5 cm, and thereafter was heated at 190°C for 10 minutes. Then the plate was cooled and taken out and obtained a porous plate. The porous plate had a smooth lower surface and an porous upper surface wherein a number of long continuous glass fibres were positioned in the porous surface portion in voluminous state and fixed with resin in this state, and a number of open pores were formed between the glass fibres. The thickness of the plate was 0.4 cm.

Then, 15 g of said polyethylene was dispersed on an area portion of 5 cm × 5 cm on the porous surface of the plate, thereon was covered a plate of stainless steel having the dimensions of 10 cm × 10 cm × 0.2 cm, these were heated at 180°C under the pressure of 1 kg/cm$^2$ for 3 minutes. Thereafter these were cooled and taken out, thus a complex or bonded plate was obtained.

The complex plate was constructed by two layers of the copolymer and polyethylene, which were firmly bonded each other. The bonding strength was 6 kg/cm when the bonded surface was peeled off by means of peeling testing machine. After the peeling test was conducted, peeled surfaces were examined and it was found that minute pieces of polyethylene were left adhered to the porous surface of the plate wherein open pores were formed, while minute pieces of glass fibres were similarly accompanied to polyethylene layer.

Said bonding strength by means of peeling testing machine was measured in the following manner: A piece having the dimensions of 5 cm × 5 cm was cut from the porous plate. The porous plate was bonded with polyethylene layer in the same manner as stated above. At that time, aluminium foil was inserted between the porous plate and polyethylene layer in the half area until 2.5 cm from one side in order to prevent the plate and polyethylene layer from adhering each other. The obtained bonded piece was further cut into a test piece having the dimensions of 1 cm × 5 cm. Unadhered portion due to insertion of the aluminium foil was bent in opposite sides respectively to the right angle and was made in a linear state, and thus obtained test piece was pulled by taking the bent portions by means of a tensile testing machine. Thus measured strength was made to bonding strength.

COMPARATIVE EXAMPLE 2

In this Comparative Example, a bonded product was obtained in the same manner as in Example 9, except that the glass matt which was high in bulk density and identical with that used in Comparative Example 1, was used.

Obtained plate of copolymer was made porous by means of glass fibres and had slightly rugged surface, however, had not any of open pores as seen in that of Example 9.

The bonded product obtained in this Comparative Example was not so firmly bonded between two layers, and peeling test value was less than 0.05 kg/cm.

COMPARATIVE EXAMPLE 3

In this Comparative Example, copolymer identical with that used in Example 6 was used, a foaming agent was incorporated in the resin, however glass matt was not used. Thus, a porous article was obtained, and polyethylene layer was bonded on porous surface of said article in the same manner as in Example 6.

As the foaming agent, azodicarbonamide, of which trade name was Unifoam AZ-L (manufactured by Otsuka Yakuhin Co.), was used. 0.05 part by weight of said foaming agent was added to the resin, and the resultant mixture was kneaded by means of rolls at 160°C for 5 minutes, then the mixture was obtained in the form of a sheet. The sheet was cut into four sheets. The four sheets were piled together, and thus piled sheets were put into a pressing machine, therein pressed at 170°C under the pressure of 25 kg/cm$^2$ for 5 minutes, and thus a plate having the dimensions of 15 cm × 15 cm × 0.2 cm.

Thereafter the plate was heated at 190°C for 5 minutes to obtain a porous article having the thickness of 0.7 cm.

The porous article was shaved off by 0.2 cm in depth from the surface, thus a rugged surface was formed. Polyethylene layer was bonded on the rugged surface in the same manner as in Example 6.

A bonded product thus obtained was easily peeled off from the bonded surface, and peeling test value was 0.1 kg/cm.

EXAMPLE 10

In this example, a porous article which had open pores on the surface was obtained in the same manner as in Example 9, except that polyethylene pellets, of which trade name was Petrothene 248, were used instead of the copolymer, ratio of said pellets against the Glasslon Continuous Matt was made to 70:30 by weight, and preshaping conditions were made at first to be preheated 160°C for 5 minutes and then to be compression-molded at 160°C under the pressure of 5 kg/cm$^2$ for 5 minutes.

Thus, a preshaped article was obtained. The article was further heated at 190°C under no pressure for 5 minutes, and a porous plate having the dimensions of 15 cm × 15 cm × 0.5 cm was obtained.

The porous plate had open pores on the surface. Soft polyvinyl chloride layer was formed on said surface. In forming the soft polyvinyl chloride, powders were sprinkled over the surface of the article so as to be in uniform thickness of 0.6 g/cm$^2$, then the resultant article was heated at 180°C under no pressure. Thus, a bonded product was obtained.

The bonded product had two layers firmly bonded each other. Peeling test value was 3.0 kg/cm.

The bonded product having dimensions of 15 cm × 15 cm was exposed alternately to the atmospheres at 60°C and −20°C respectively, for every 2 hours totally 20 times. As the result, the bonded product showed neither any change in appearance, nor any decrease in bonding strength, and peeling test value was 3.1 kg/cm.

EXAMPLE 11

This example intended to obtain a bonded product of thermoplastic resin layer and thermosetting resin layer. As the thermoplastic resin, polyethylene, of which trade name was Petrothene 248, which was identical with that used in Example 4, was used, and as the thermosetting resin, unsaturated polyester resin, of which trade name was Polylite (manufactured by Dainihon Ink Co.) was used. As a glass matt, Glasslon Continuous Matt identical with that used in Example 1 was used.

Said matt and polyethylene were mixed in the ratio of the former 30 and the latter 70 by weight. In mixing these, at first polyethylene was placed underneath, thereon glass matts were placed, further thereon polyethylene was placed, thereon further glass matts were placed, and so on, thus three layers of glass matts and four layers of polyethylene were alternately piled up. Thus piled mixture was put in a mold frame having the inner dimensions of 15 cm × 15 cm × 0.2 cm, and these were preheated at 160°C, then these were pressed at 160°C under the pressure of 5 kg/cm$^2$ for 5 minutes. Thus, a preshaped plate having the dimensions of 15 cm × 15 cm × 0.2 cm was obtained.

Said plate was further put in another mold frame having the inner dimensions of 15 cm × 15 cm × 0.5 cm, and these were heated at 190°C for 5 minutes, without adding substantial pressure. Thus, a porous plate was obtained.

The porous plate had a number of open pores on the surface, and had the thickness of 0.5 cm.

Said unsaturated polyester resin was contained in the normal glass cloth, with a catalyst for use in hardening said resin at room temperature, said glass cloth was applied and pressed to the porous surface of the porous plate, then these were left as they were at room temperature for 24 hours. Then, a bonded product was obtained, in which polyester resin layer was firmly adhered to the porous article of polyethylene and glass fibres.

Peeling test value of this bonded product was 5.0 kg/cm. Tensile shear strength of this bonded product was 53 kg/cm.

The tensile shear strength herein referred to was measured in the following manner: A piece of thermoplastic resin having the dimensions of 10 cm × 10 cm and thermosetting resin were adhered together under pressure on an area of 10 cm in width and 2 cm in length, wherein said thermosetting resin included glass cloth in the ratio of the resin containing hardening agent 70 weight parts against two sheets of the glass cloth having dimensions of 10 cm × 10 cm (corresponding to JIS-R-3411-EM 330) 30 weight parts, the resultant adhered piece was hardened, thus a bonded product was prepared, and the bonded product was cut into a test piece having a 1 cm in width. The test piece was set in tensile testing machine and measured.

COMPARATIVE EXAMPLE 4

In order to compare with Example 10, this Comparative Example was carried out in the same manner as in Example 10, except that Glasslon Continuous Matt was not used herein.

The resultant bonded product was easily peeled off into two layers. Peeling test value was less 0.05 kg/cm, and tensile shear strength was 1.0 kg/cm$^2$.

EXAMPLE 12

This example intended to obtain a bonded product of thermoplastic resin and portland cement. Polyethylene, of which trade name was Petrothene 248, which was identical with that used in Examples 4 and 11, was used as a thermoplastic resin, and portland cement (produced by Onoda Cement Co.) was used. Glasslon Continuous Matt identical with that used in Example 1 was used as a glass matt.

In mixing polyethylene with Glasslon Continuous Matt, mixing ratio was rendered to the former 90 weight parts and the latter 10 weight parts, polyethylene resin was divided into four portions, the glass matt was divided into 3 portions, and each of three portions of the glass matt was inserted into each of four portions of the resin. Thus obtained mixture was preheated at 160°C, then placed in the pressing machine and pressed at 160°C under the pressure of 5 kg/cm$^2$ for 5 minutes, thus a plate having the dimensions of 15 cm × 15 cm × 0.2 cm was obtained. The plate was put into a mold frame having inside dimensions of 15 cm × 15 cm × 1 cm, then heated at 180°C for 5 minutes without adding pressure, thus a plate having the dimensions of 15 cm × 15 cm × 0.25 cm was obtained. Said plate had a number of open pores on the surface.

A mixture of cement 1, sands 3 and water 0.6, weight parts respectively, was applied on said porous surface of the plate, and the mixture was hardened, thus a bonded product was obtained.

In the bonded product, resin layer and cement layer were firmly adhered each other. The bonded product showed a tensile shear strength of 5.0 kg/cm$^2$ and an adhering strength of 1.4 kg/cm$^2$.

Tensile shear strength of said bonded product was determined according to the method described in Example 11. Said adhering strength was determined by the following method: a piece having the dimensions of 5 cm × 5 cm was cut out from said porous plate, cement mixture identical with said mixture was applied on said piece at a center portion having an area of 3 cm × 3 cm, then said mixture was hardened, thus a test piece was obtained. Resin layer and cement layer were peeled off in the opposite directions by means of a tensile testing machine, and the value at that time was made to the adhering strength.

We claim:

1. A process for manufacturing a porous thermoplastic resin article reinforced by glass fibres which comprises using one or more matts of glass fibres, which have a bulk density of 0.4 g/cm$^3$ or less when compressed under the pressure of 10 g/cm$^2$, and also a bulk density of 0.6 g/cm$^3$ or less when compressed under the pressure of 1000 g/cm$^2$, and further which have an inherent property that the matts restore elastically to more than 50 percent volume of the original volume when said pressures are removed, admixing 5–70 weight parts of said matts with 95–30 weight parts of thermoplatic resin to form resin distributed matts, then heating and pressing the resin distributed matts above a temperature at which the resin is at least fused to obtain an article in which both the fibres and resin are combined into a bonded mass, thereafter maintaining the article at a temperature higher than the flowing temperature of the resin to form pores in said article by means of the restoring force of the pressed glass fibres, and finally cooling said article.

2. A method as defined in claim 1 wherein the matts of glass fibres are selected from the group consisting of continuous strands matt, surfacing matt, and glass wool matt.

3. A method as defined in claim 1 wherein the matts of glass fibres have a bulk density of 0.25 g/cm$^3$ or less when compressed under the pressure of 10 g/cm$^3$, and also a bulk density of 0.35 g/cm$^2$ or less when compressed under the pressure of 1000 g/cm$^2$, and further have an inherent property that the matts restore elastically to more than 80 percent volume of the original volume when said pressures are removed.

4. A method as defined in claim 1 wherein the thermoplastic resin has an apparent melt viscosity of $2 \times 10^5$ or less poises at the temperature 100 – 250°C.

5. A method as defined in claim 1 wherein the thermoplastic resin is selected from the group consisting of polyvinyl chloride, copolymer of vinyl chloride and ethylene, copolymer of vinyl chloride and vinyl acetate, polyethylene, copolymer of ethylene and vinyl acetate, polypropylene, copolyer of ethylene and propylene, polystyrene, copolymer of styrene and acrylonitrile, and acrylonitrile-butadiene-styrene-copolymer.

6. A method as defined in claim 1 wherein a shape of the thermoplastic resin is selected from the group consisting of powdery form, pellet form and sheet form.

7. A method as defined in claim 1 wherein the mixing ratio of the matts of glass fibres and the thermoplastic resin is within the range of the former 15–40 weight parts and the latter 85–60 weight parts.

8. A method as defined in claim 1 wherein mixing is carried out in the manner that the thermoplastic resin is in the form of a plurality of sheets, each of which is placed on each matt of glass fibres alternately.

9. A method as defined in claim 1 wherein a foaming agent is incorporated in the resin.

10. A method as defined in claim 9 wherein the foaming agent is decomposed at temperatures 150°C to 250°C and generates gas.

* * * * *